United States Patent
Kamada et al.

(10) Patent No.: US 7,039,928 B2
(45) Date of Patent: *May 2, 2006

(54) METHOD AND DEVICE FOR OBTAINING AUDIENCE DATA ON TV PROGRAM

(75) Inventors: Tomihisa Kamada, Tokyo (JP); Takeshi Motohashi, Tokyo (JP); Eiji Kuwana, Tokyo (JP)

(73) Assignees: Access Co., Ltd., Tokyo (JP); Nippon Telegraph and Telephone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 530 days.

(21) Appl. No.: 09/319,649

(22) PCT Filed: Dec. 12, 1997

(86) PCT No.: PCT/JP97/04576

§ 371 (c)(1),
(2), (4) Date: Jun. 10, 1999

(87) PCT Pub. No.: WO98/26608

PCT Pub. Date: Jun. 18, 1998

(65) Prior Publication Data

US 2003/0056208 A1  Mar. 20, 2003

(30) Foreign Application Priority Data

Dec. 13, 1996  (JP) ................................. 8-352905

(51) Int. Cl.
*H04N 9/00* (2006.01)
*H04N 7/16* (2006.01)
*H04N 5/445* (2006.01)
*H04N 7/173* (2006.01)
*G06F 15/16* (2006.01)

(52) U.S. Cl. .................. 725/9; 725/14; 725/46; 725/109; 725/110; 709/224

(58) Field of Classification Search ............ 725/9, 725/109, 110, 34–35, 51, 46, 116, 2, 14, 20; 709/236, 219–220

See application file for complete search history.

(56) References Cited

U.S. PATENT DOCUMENTS

| | | | | | |
|---|---|---|---|---|---|
| 4,258,386 | A | * | 3/1981 | Cheung | 725/14 |
| 4,857,999 | A | * | 8/1989 | Welsh | 725/22 |
| 5,374,951 | A | * | 12/1994 | Welsh | 725/20 |
| 5,635,989 | A | * | 6/1997 | Rothmuller | 725/46 |
| 5,758,257 | A | * | 5/1998 | Herz et al. | 725/116 |
| 5,774,170 | A | * | 6/1998 | Hite et al. | 725/34 |
| 5,798,785 | A | * | 8/1998 | Hendricks et al. | 725/46 |
| 5,801,747 | A | * | 9/1998 | Berard | 725/46 |
| 5,848,396 | A | * | 12/1998 | Gerace | 705/10 |
| 5,977,964 | A | * | 11/1999 | Williams et al. | 345/721 |
| 6,049,831 | A | * | 4/2000 | Gardell et al. | 709/236 |
| 6,067,564 | A | * | 5/2000 | Urakoshi et al. | 725/2 |

FOREIGN PATENT DOCUMENTS

WO  95/12278  5/1995

* cited by examiner

*Primary Examiner*—Hai Tran
(74) *Attorney, Agent, or Firm*—Dellett & Walters

(57) ABSTRACT

The TV program table data in the area where a viewer resides are received through the Internet or a broadcasting medium by using the TV set with an internet connection function at the viewer. While the viewer is watching a TV program, the audience data including viewed channel information and viewed time information are automatically obtained. The obtained audience data are compared with the TV program table data to identify the watched program. The program ID of the identified program and the viewed time information are transferred to a data collecting center through the Internet together with the viewer ID data. By utilizing the Internet for the distribution of the TV program table data to the viewers and for the collection of the audience data, the nationwide TV audience data can be easily collected and used to make statistics. Since viewed channel and viewed time information are correlated with programs on the viewer's side, the load of processing the data on the center side can be relieved.

25 Claims, 12 Drawing Sheets

F I G. 4

TOKYO 1996.12.23

| CH.ID | CH. NAME | 06:00 | ... | 19:00 | 20:00 | ... |
|---|---|---|---|---|---|---|
| CH.1 | MHK-GENERAL | :00 GOOD MORNING | ... | :00 DRAMA | :00 DOCUMENTARY | ... |
| CH.3 | MHK-EDUCATION | :00 BIOLOGY :30 EXERCISE :45 ITALIAN | ... | :00 ENGLISH CONVERSATION :30 GERMAN | :00 FRENCH :30 RUSSIAN | ... |
| CH.4 | ○○TV | :00 MORNING | ... | :00 ANIMATION | :00 DRAMA 2 | ... |
| ... | ... | ... | ... | ... | ... | ... |
| CH.12 | TV□ | :00 NEWS | ... | :00 ANIMATION | :00 DRAMA 3 | ... |
| CH.42 | SATELLITE TV | :00 NEWS :30 BUSINESS | ... | :00 SPORTS | :00 MOVIE | ... |
| ... | ... | ... | ... | ... | ... | ... |

FIG. 8

| 801 | 802 | 803 | 804 | 805 | 806 | 807 | 808 | 809 |
|---|---|---|---|---|---|---|---|---|
| CH ID | PROGRAM ID | DATE [y.m.d] | T 1 [h:m] | T 2 [h:m] | S T [h:m] | E T [h:m] | Δ T [h:m] | Q (P) [%] |
| CH3 | ENGLISH CONVERSATION | 1996.12.23 | 19:00 | 19:30 | 19:02 | 19:30 | 00:28 | 93 |
| CH3 | GERMAN | 1996.12.23 | 19:30 | 20:00 | 19:30 | 19:36 | 00:06 | 20 |
| CH4 | ANIMATION 1 | 1996.12.23 | 19:00 | 20:00 | 19:37 | 19:58 | 00:21 | 35 |
| CH12 | DRAMA 3 | 1996.12.23 | 20:00 | 21:00 | 20:00 | 21:00 | 00:60 | 100 |
| CH12 | MOVIE | 1996.12.23 | 21:00 | 22:00 | 21:00 | 21:23 | 00:23 | 38 |
| CH6 | ... | 1996.12.24 | 18:00 | 19:00 | 18:05 | 18:17 | 00:12 | 20 |
| CH8 | ... | 1996.12.24 | 18:00 | 19:00 | 18:17 | 18:59 | 00:42 | 70 |
| ... | ... | ... | ... | ... | ... | ... | ... | ... |

METHOD AND DEVICE FOR OBTAINING AUDIENCE DATA ON TV PROGRAM

TECHNICAL FIELD

The present invention relates to an audience rating research of television (TV) broadcasting, and particularly to a method and apparatus for obtaining audience data of TV programs of viewers by the use of the Internet function.

BACKGROUND ART

The audience rating of television broadcasting programs (hereinafter simply referred to as TV programs or programs), especially those regarding commercial broadcasting stations are of great interest to their sponsors which are companies or enterprises, and hence, it is desired to simply and correctly grasp which programs were viewed, with respect to as many viewers (households) as possible. At the same time, it is preferable to avoid bothering the viewers for that purpose.

Conventionally, a special device is used for collecting audience data of TV programs, as described in Japanese laid-open (KOKAI) application No. 63-37726. This device is connected to a TV set of a viewer who is a monitor, so as to automatically record his or her watching channels and their time data. Which channel is currently being watched is detected by a channel detector. This is realized by picking up a leak wave from the local oscillator of the TV set. The detected viewing channel data and viewing time data are recorded in the device. The recorded data are transferred via a telephone line to a collection center by polling from the center within a limited period of time at midnight.

Such prior art technique requires a hardware device dedicated for collecting audience data at each of the monitor households. In general, the more is the number of the monitors, the more the preciseness of the audience rating research is improved. However, it will cost a lot to deliver such special devices to a lot of households. Also, the communication fees for collecting data are not negligible (especially in long-distance calls).

Therefore, conventionally, the area in which audience data are to be collected is limited and the number of monitors is also limited, thus making it difficult to perform nationwide data collection.

In addition, for the nationwide data correction, TV programs even of the same channel may be different with each other depending upon the areas, and the contents of programs vary day by day even on the same channel in the same area. Thus, the viewed channel and time data collected from a given monitor are compared, at the collection center, with program table data of that date of the area where the monitor resides, so as to determine the viewed time of individual programs. This process has to be performed for all the monitors, which will cause a problem that the more the number of monitors is increased, the greater is the processing load at the collection center.

In recent years, personal computers have come into wide use even in general homes, rapidly expanding the use of the Internet. The Internet is a gigantic aggregation of computer networks which are interconnected in a world-wide scale. Its main functions include electronic mail, net news (electronic bulletin board or electronic conference), file transfer (FTP: File Transfer Protocol), world-wide web (WWW), etc. In particular, the WWW is a set of hyper text documents written in a language called HTML (Hyper Text Markup Language), which links various items of information, dispersedly existing on the Internet, with one another to be accessed. The hyper text documents are distributed by computers on the Internet, called a WWW servers. A user, at a client computer, can access documents on the Internet by using a browsing software, called WWW browser (also referred to as a web browser). The connection of the client computer with the Internet is performed through an organization, generally called a service provider, which provides a service to let people to use the private communication line owned by the provider. All the documents of WWW are assigned with unique addresses on the Internet, called URLs (Uniform Resource Locators).

Recently, TV sets with an internet connecting capability or computers with a TV viewing capability have become commercially available for family use.

In these situations, the present invention aims to provide method and device for collecting audience data on TV programs, without the need for hardware devices dedicated for collecting audience data.

Another object of the present invention is to provide method and device for collecting audience data on TV programs, capable of reducing the processing load at the data collection center, by correlating, on the viewer's side, individual programs with viewed channels and time information.

DISCLOSURE OF INVENTION

According to the present invention, there is provided a method for obtaining audience data on TV programs, in an audience data obtaining device which uses a computer, the method comprising the steps of: a first step of obtaining, from outside, TV program table data for an area where a viewer resides; a second step of obtaining audience data which include viewed channel information and viewed time information of TV; a third step of obtaining at least a program ID of a viewed program by comparing the audience data with the TV program table data; and a fourth step of transferring, via the Internet to a collection center, the obtained program ID and the viewed time information along with ID data of the viewer.

The viewed time information is, for example, view start time and view end time and/or view period of time. Also, the program ID is a title of the program or identification information by which the program can be identified.

According to the present invention, it is possible to make use of a device already present at each household, i.e., a TV set with an internet connecting capability or a personal computer with a TV viewing capability, thereby eliminating the need of preparing hardware devices dedicated for audience data collection on the researcher's side and distributing them to monitors. In the present invention, however, it is not intended to exclude such a form of dedicated hardware device, externally attached to a TV set, for collecting audience data.

It is sufficient for the researcher to initially incorporate in the device a computer program for realizing the audience data collection method (e.g., in the form of a ROM in the device), or to install afterward the computer program in a non-volatile storage device. The afterward installing can be performed manually with a portable recording medium such as a CD (Compact Disc)-ROM, floppy disc, etc. Alternatively, the program can manually or automatically be installed online from outside.

No need of the delivery to any audience households of the dedicated hardware for audience data collection makes it easy to conduct a nationwide audience rating research with the aid of the internet. Compared with the conventional one-to-one communication between each viewer and the data collection center, the use of the Internet allows the viewer to access the center via a nearby access point of the provider, which reduces the telephone charges and the congestion of line accesses, facilitating the collection of audience data in a wide area over the country.

Further, the viewed channel and time information are correlated, on the viewer's side, with individual programs, thereby reducing the processing load at the collection center.

The first step may comprise automatically and regularly obtaining the TV program table data via the Internet or a broadcasting medium, and the fourth step may comprise regularly and automatically performing the transfer to the collection center. This allows acquisition of the TV program table data and transfer of the collected data to be carried out without relying on the viewer, thereby enhancing the reliability of the system.

Preferably, also by using the opportunities of the Internet connection that is started by the viewer's operation, the TV program table data may be automatically acquired in the first step, and the data transfer to the collection center may be automatically performed in the fourth step. This relieves the congestion of accesses when the server, that offers the TV program table data, and the server at the collection center are accessed by the viewers, dispersing the processing loads on the servers.

In the third step, a continuously viewed time of a certain program may be ignored, if the time is shorter than a predetermined time. The audience data of extremely short viewed times, which are obtained when the channel is switched again and again within a short time, are sometimes to be recognized preferably as no actual views. In such cases, this arrangement can effectively eliminate the extremely short term view data.

In the forth step, the data to be transferred may be transmitted as an HTML text document or an electronic mail. The former enables the prompt collection processing of the audience data, while the latter reduces the load of the server at the collection center.

In addition, the TV set with Internet connection capability or the personal computer with TV viewing capability at each home, that has installed therein the computer program to realize the above approach, will serve as an audience data collection device in the present invention. It should be noted that the method of obtaining audience data according to the present invention is carried out at each household, but the method itself is used by the audience rating researcher.

A recording medium which stores a computer readable program for realizing the method of the invention is also within the scope of the invention. Such recording media include CD-ROMs, floppy discs, mini-discs (MDs), Zip media, memory cards, etc. and even a secondary stationary storage device such as a hard disc.

BRIEF DESCRIPTION OF DRAWINGS

FIG. 4 is a diagram for explaining an exemplary configuration of program table data in the embodiment according to the present invention;

FIG. 8 is a diagram for explaining an exemplary configuration of an audience data table in the embodiment according to the present invention;

BEST MODE FOR CARRYING OUT THE INVENTION

Preferred embodiments in accordance with the present invention will now be explained according to the drawings.

Figure 1:
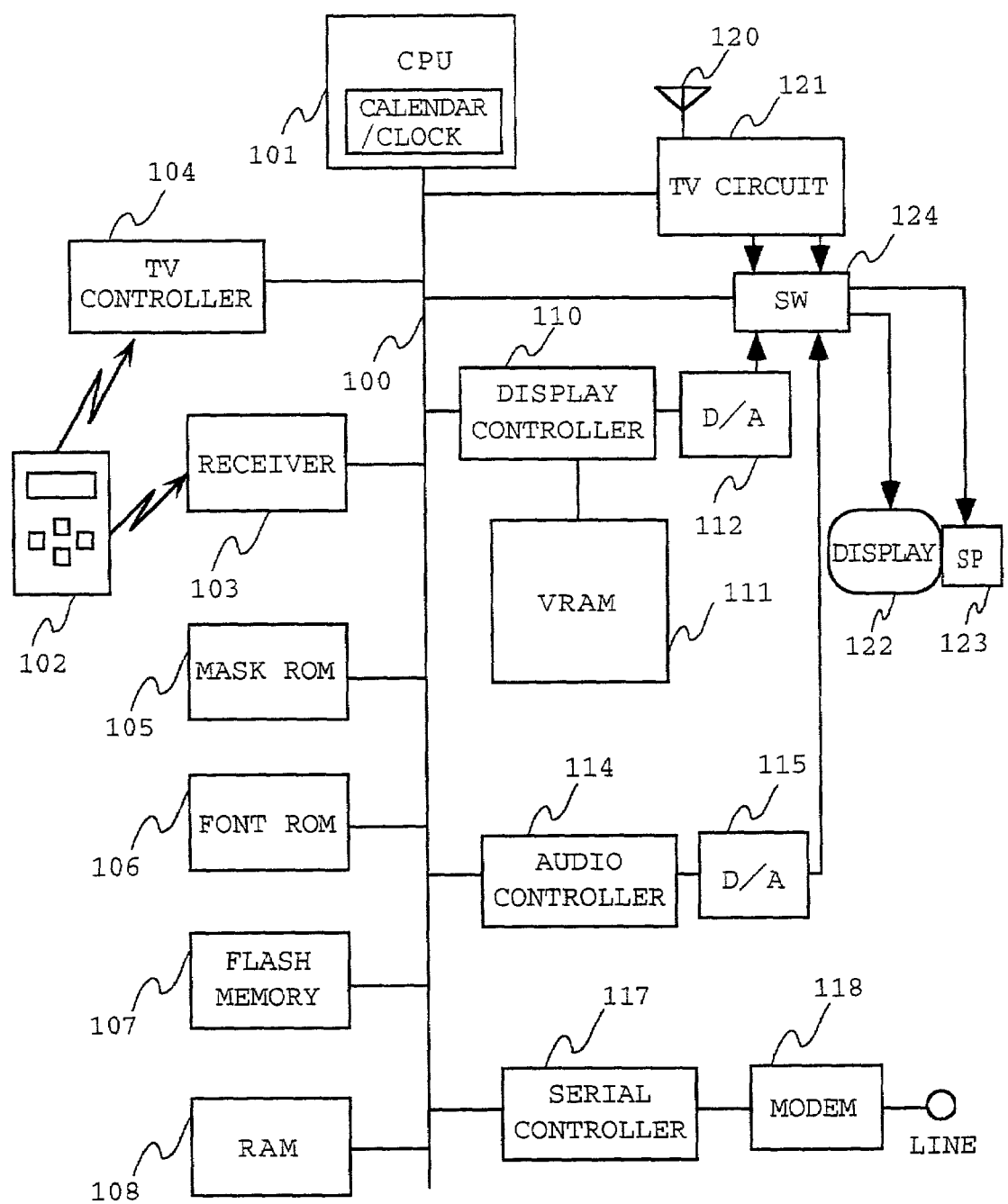
FIG. 1 is a block diagram showing an exemplary hardware configuration of a device to which the present invention is applied.

Referring first to FIG. 1, there is shown a block diagram which illustrates an exemplary hardware configuration of a device to implement the embodiment. Here, a TV set with an internet connecting capability is assumed. A personal computer with a TV viewing capability may, however, also be used. A device of the present invention may also be a form which is attached externally to a TV set when using means for detecting the viewed channel information in a non-contact manner as mentioned above.

In the configuration shown in FIG. 1, a central processing unit (CPU) 101, connected to a bus 100, serves to control via the bus 100 the entirety of the device shown in FIG. 1. The CPU 101 is provided with a calendar/clock function for managing the current date and time. A mask ROM 105 stores therein various computer programs to be executed by the CPU 101 and necessary data. A font ROM 106 stores therein data of fonts which are used on the TV screen. A flash memory 107, a rewritable nonvolatile memory, is to store URLs (uniform resource locators), e-mail addresses, etc. which a viewer wishes to memorize in a non-volatile manner. The flash memory 107 may also be used for storing a program whose version is to be updated. In place of, or in addition to the flash memory, a secondary storage device such as a mini discs (MD) and a hard disc which are non-volatile storage means. A RAM 108 offers a temporary storage or work area which is necessary for the CPU 101 to execute the programs, and an area for storing various parameters necessary for the execution of the programs.

Connection to a public line or network is performed via a line terminal (LINE). The line terminal is connected via a modem 118 and a serial controller 117 to the bus 100. For the ISDN network, a data service unit (DSU) and a terminal adapter (TA) (both not shown) are used.

When this device displays, on the display 122, information of a page received from the public line, the data to be displayed is first drawn in a display memory (VRAM) 111 via a display controller 110. The content of the display memory 111 is forwarded via a digital-to-analog (D/A) converter 112 to a switch circuit 124.

Information in a page sometimes includes audio information. To deal with such audio information, an audio controller 114 and a digital-to-analog (D/A) converter 115 are provided, from which an audio signal is output to the switch circuit 124.

A TV circuit 121 extracts and demodulates video and audio signals of a channel selected from broadcast waves, which are received via an antenna 120, to forward them to the switch circuit 124.

The switch circuit 124, under control of the CPU 101, switches between the signals from the TV circuit 121 and the D/A converter 112 to forward the selected signal to a display 122 and a loudspeaker (SP) 123.

A user operates the device with a remote controller 102. A signal generated from the remote controller 102 (e.g., an IR ray signal) is received at a receiver 103, which is then interpreted by the CPU 101. The remote controller 102 is also used for controlling the normal TV operation. The signals for the TV operation are transferred via a TV controller 104 to the CPU 101.

In the FIG. 1 configuration, the CPU 101 is commonly used for controlling both the internet elements and the TV elements, but separate CPUs may be used for them.

The connection to the Internet in the FIG. 1 device is instructed by the user with the remote controller 102, for example, by pressing a special button thereon for that purpose. This will activate a software for Internet browsing, called a web browser, and perform a dial-up connection to an internet connection dealer, called an internet service provider. By this, a menu screen (not shown) including, for example various menu items, will appear on the TV display. The viewer can browse desired pages by selecting any menu items on the menu screen.

Figure 2:
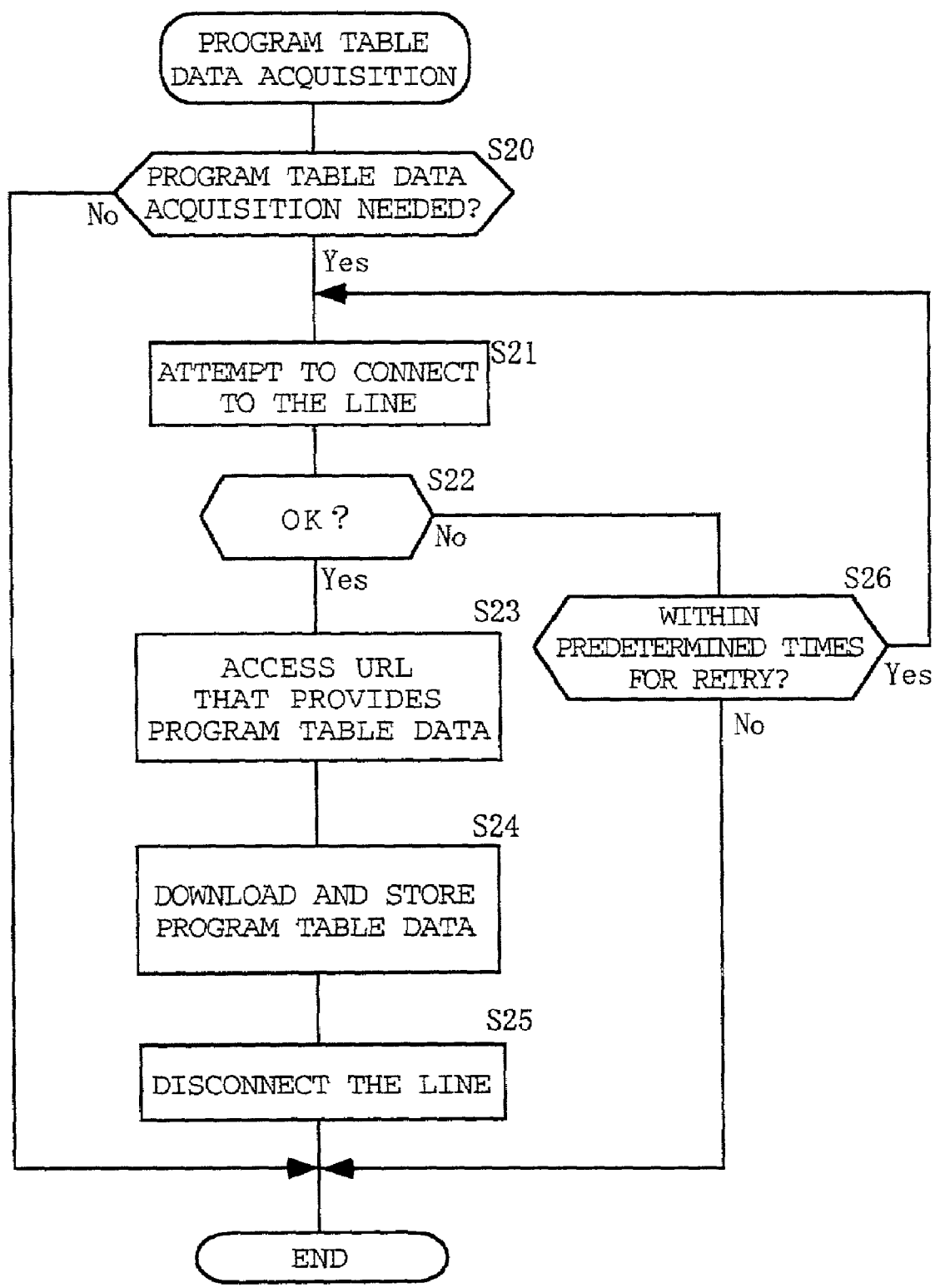
FIG. 2 is a flowchart showing a process for obtaining program table data in an embodiment according to the present invention.

Referring to FIG. 2, there is shown a flowchart which illustrates a process for obtaining program table data in the present embodiment. This process is automatically activated regularly, e.g., once a week at a predetermined time (preferably in the midnight during which no TV programs are being aired), so as to automatically access a site on the Internet which provides TV program table data. The predetermined time may be set slightly differently for each household, considering the fact that if the predetermined time is set the same for all the monitor households the accesses would congest excessively to the server of the same site. Alternatively, the program table data may be distributed by e-mail to each viewer, in which case their accesses will be relieved because it is sufficient for each viewer to access their own mail box.

When it is confirmed by the calendar/clock function that the set day and time has come, it is decided first whether or not program table data is to be obtained (S20). This step is provided for the reason that there is no need to acquire the table data everyday, for example, in a case where program table data of up to a week ahead is acquired at a time. New program table data may be acquired only at a time when the program table data expires a few days later. The decision step S20 is useful also in a case where program table data is irregularly acquired, e.g., by making use of opportunities of viewer's voluntary accessing to the Internet, as stated below.

If it is decided that program table data is to be acquired, then an attempt will be made to connect to the line (S21). If the line connection fails (No in S22), then a retry is made within predetermined times for retry (S26 and S21). If the number of times for retry is exceeded, then the connection to the line is abandoned and this process is terminated (END).

If the line connection is successful (Yes in S22), then an access is first made to a URL that provides the program table data (S23). This URL has been set in advance. For example, the URL is automatically stored in the flash memory 107 at the time of installing the program for obtaining audience data. Then, the program table data is downloaded from the site of the URL, and stored also in the flash memory (S24). If the RAM 108 includes a battery-backedup area, the program table data may be stored in that area. Alternatively, the data may be stored in a secondary storage unit such as a hard disc, if any. Subsequently, the line is disconnected (S25) and this process is terminated (END).

Alternatively, the acquisition of the program table data may be performed not via the Internet, but by the TV set which automatically acquires the data, for example, from a broadcasting medium (the teletext or intertext).

Figure 3:
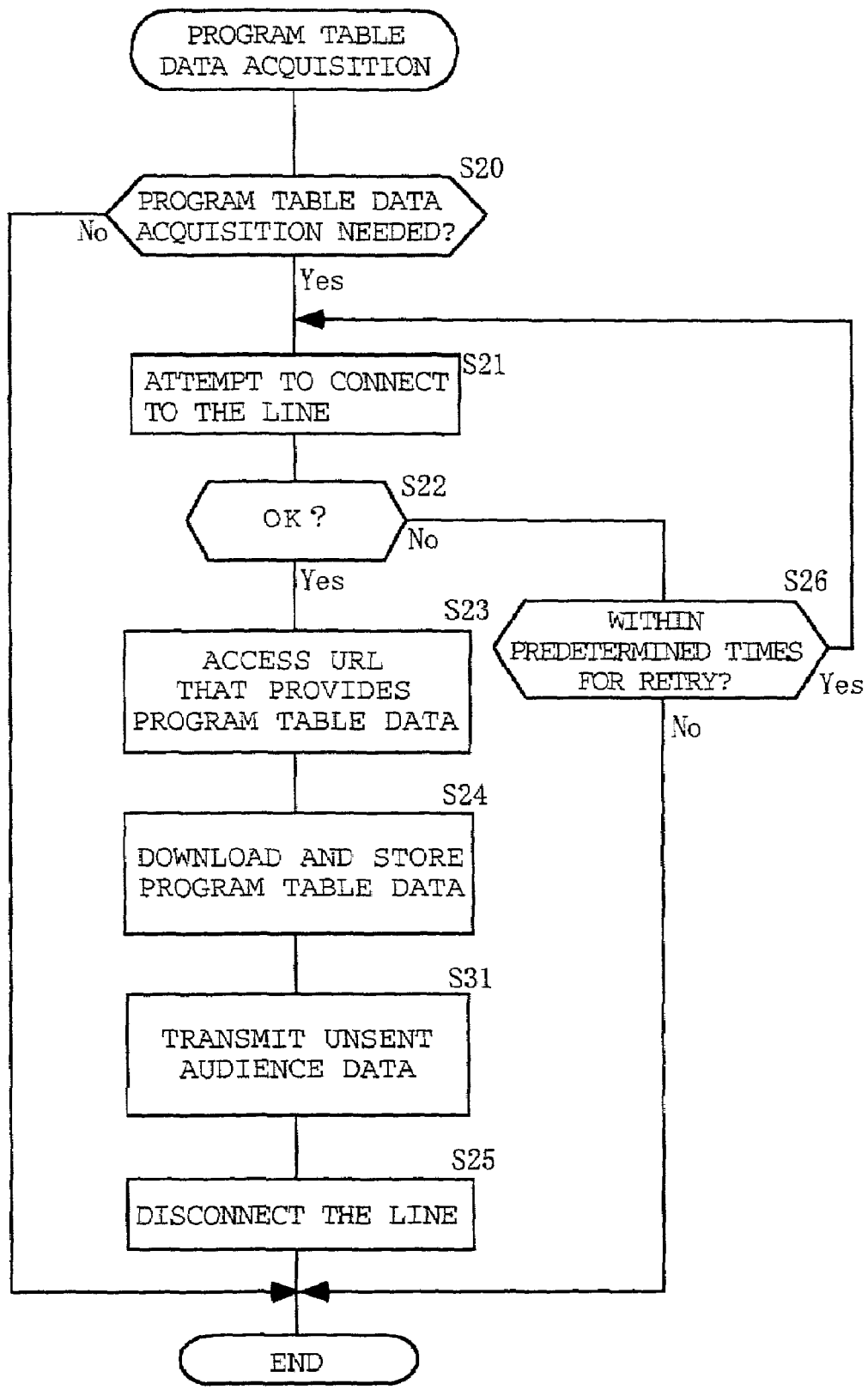
FIG. 3 is a flowchart showing a modified version of the process for obtaining a program table data shown in FIG. 2.

FIG. 3 is a flowchart showing a modified version of the process for obtaining a program table data shown in FIG. 2. This is to use the opportunity of obtaining the program table data, also for performing an operation of sending to a collection center unsent audience data stored on the viewer's side as described below.

The process shown in FIG. 3 is the same as that in FIG. 2, except that step 31 for transmitting the unsent audience data is inserted between steps S24 and S25 in FIG. 2.

FIG. 4 shows a specific example of the program table data. This is an exemplary program table (but not real one) of TV broadcast channels in Tokyo area on Dec. 23, 1996. From this program table, it can be recognized which channels provide what programs at a given time on a given date in that area. What time a given program is started from and ended at are also recognizable from this program table.

Although shown in FIG. 4 as a table form which a viewer can view by a browser on a TV screen, the program table may be of text data or binary data if no display of the data is intended for the viewer.

Figure 5:
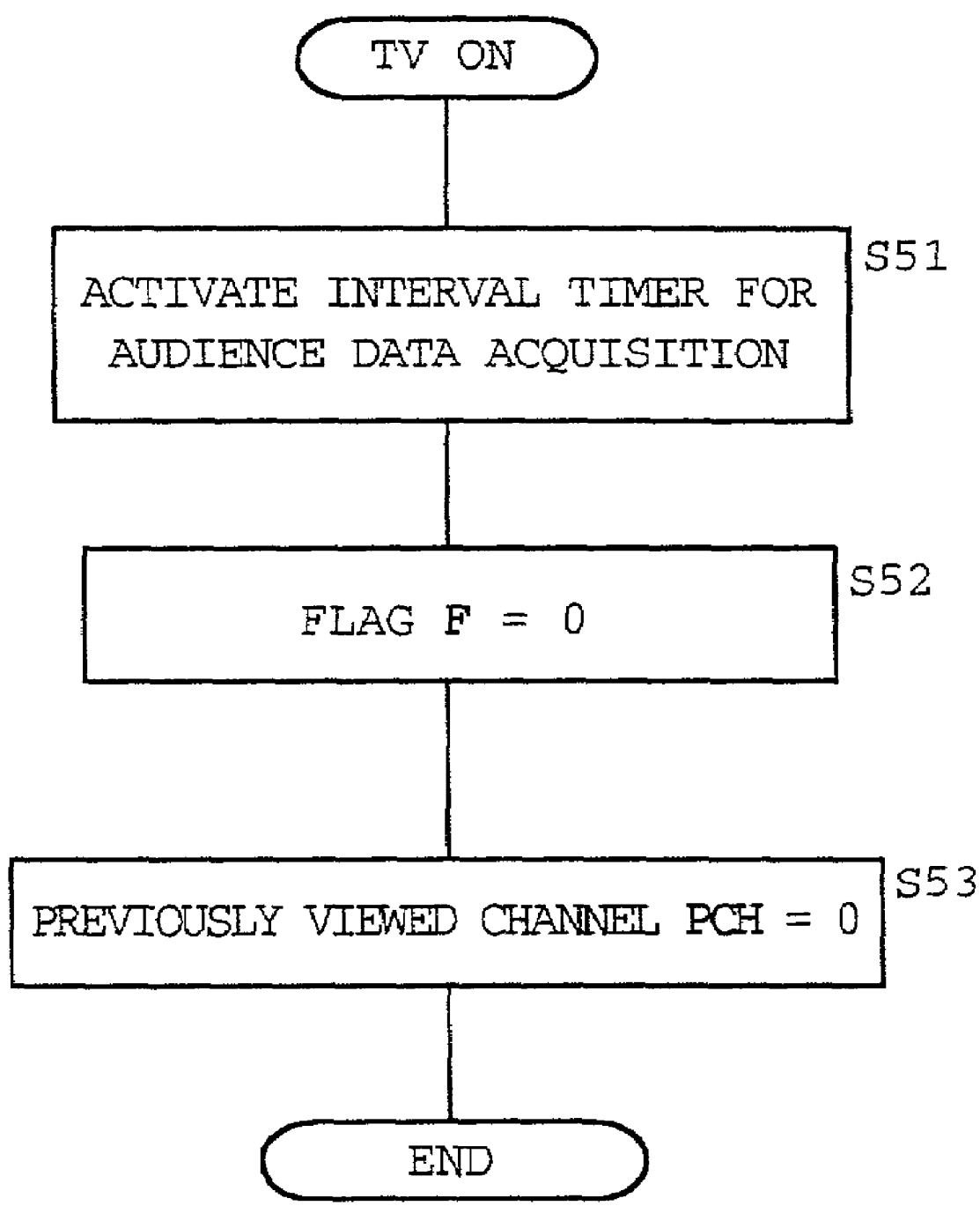
FIG. 5 is a flowchart showing an exemplary process which is performed when TV is turned on in the embodiment according to the present invention.

FIG. 5 shows an exemplary process which is performed when the TV is turned on. This process first activates an interval timer (not shown) for the acquisition of audience data (S51). This enables a periodic execution of an audience data acquisition process described below with reference to FIG. 6. Then, s flag F is reset to 0 (S52). This flag F will be used in the process shown in FIG. 6. Subsequently, a variable PCH for holding a previously viewed channel is reset to 0 (S53). This variable PCH will be used also in the FIG. 6 process.

Prior to explanations of FIGS. 6 an 7, an audience data table 800 will be explained, with reference to FIG. 8, as an exemplary configuration of the audience data which are obtained in the present embodiment. It should be noted that there is no need for actual audience data to be in a table form.

This audience data table 800 stores records 810–816 . . . which are added one by one for each viewed program. As stated below, however, no record is created for a program that is viewed only for a time less than a predetermined short time x (seconds). This is to prevent an extremely short-time view from being registered as a record, which occurs in a case of so-called channel shopping, where channels are switched over and over for programs. The table 800 is stored in the battery-backedup area of the RAM 108 or the secondary storage unit.

A record includes a channel identification information (CH. ID) 801 which identifies a viewed channel, a program identification information (program ID or program title) 802 which identifies the program, a view date (year. month. day) 803, a start time of the program (T1) 804, an end time (T2) 805, a view start time (ST) 806 of the program, a view end time of the program (ET) 807 of the program, a view period of time ΔT (=ET−ST) 808, and a view percentage Q(P) 809 which is a percentage of the view period of time ΔT to the full period of time of the program.

All or part of the audience data stored in the table 800 of FIG. 8 is transmitted to the collection center at predetermined times.

Figure 6:
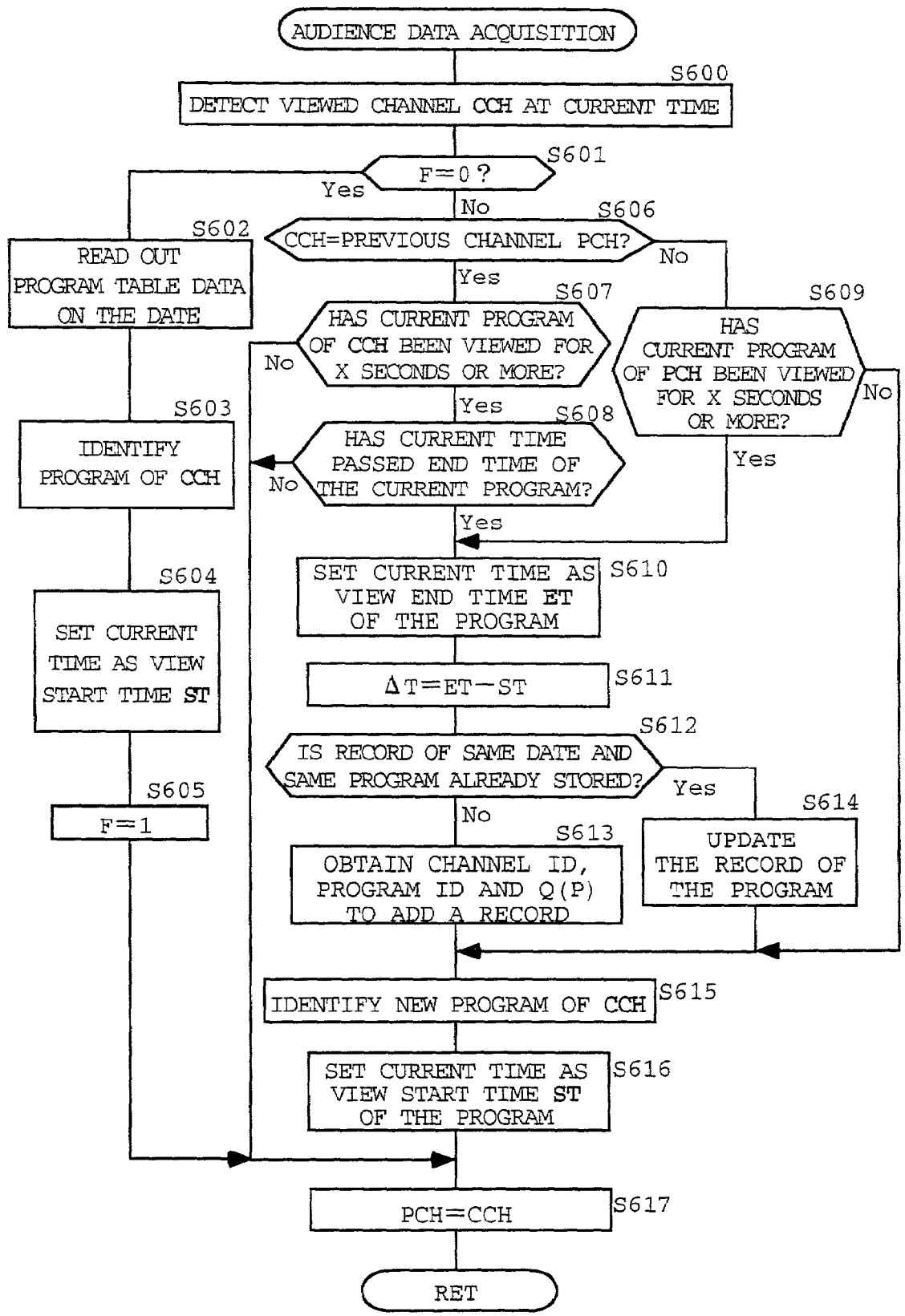
FIG. 6 is a flowchart showing an exemplary process for obtaining audience data in the embodiment according to the present invention.

FIG. 6 shows a process which is performed periodically (e.g., every few seconds) after the turning on of the TV switch till its turning off. This process automatically acquires information such as what channel a viewer is currently viewing, what is the program, and from when to when the program is viewed, without the viewer being conscious of that.

In the process of FIG. 6, firstly, the current channel which is currently being watched is detected (S600). The modern TV set with a remote controller for channel operation is provided with a command called a "channel call" which is a function to confirm which channel is currently selected. The similar function can be used to detect the currently selected channel (CH. ID). Alternatively, the above-mentioned prior art method of detecting a channel may be used in a case where the present device is separate from the body of the TV set.

Subsequently, the flag F is checked whether it is zero or not (S601). This flag F is provided in order to cause a special process to be performed only at an initial time of execution of this audience data acquisition process after the turning on of the TV set. The initial value of the flag F has been set to "0" at the TV turning on (S53 in FIG. 5). Thus, step S601 proceeds to the "Yes" branch. Then, the program table data of that date is read out of the above-described program table data (S602). Based on the program table data of the date, the program of the current channel being viewed (CCH) at the current time is identified (S603). In this event, the start and end times T1, T2 of the program are also read and temporarily stored in the RAM 108. Further, the current time is set as the view start time ST of that program (S604). That is, the current time is put in the variable ST representative of the view start time of the program. After this, the flag F is set to "1" (S605). This change of the flag value will cause step S601 to proceed to the "No" branch from the next time (a few seconds later) of execution of this audience data acquisition process.

After changing the flag value in Step S605, the current channel CCH is saved as a previous channel PCH (S617), and the audience data acquisition process this time is terminated.

In the next audience data acquisition process, a current viewed channel (CCH) is detected at that time (S600), and control proceeds to the "No" branch in Step 601 as stated above. Then, the program of the currently viewed channel CCH is compared with the previously viewed channel PCH (S606). If the channels are the same (i.e., the channel has not been changed), then it is checked whether or not the channel CCH has been viewed continuously for x seconds or more (S607). The "x seconds" is to suppress the data acquisition of a program that has been viewed only for an extremely short period of time. The value of "x" may vary depending upon to what extent a short term data is needed. Here, an exemplary value is 60 seconds. If the current channel has not been viewed continuously for 60 seconds or more, control proceeds to step S617 where the value of the CCH is set to the PCH, and this process is ended.

In the next audience data acquisition process, no change in channel takes place similarly in S606, and the procedure from step 607 through step 617 is repeated for several times. When x seconds has elapsed, control proceeds from step S607 to step S608 where it is checked whether the current time has exceeded the end time of the program of the current channel CCH. This is to settle the data of the program at borders of programs in order to collect the viewed time for each program. If not, the process of this time is terminated through step S617. Assume that after repeating such steps the current time has passed the end time of the current program in Step S608. Then, the current time is set as the view end time ET of the program (S610). That is, the current time is put in the variable ET representative of the view end time of the program. Then, the difference time ΔT is calculated by subtracting ST from ET (S611).

Subsequently, it is checked whether or not an audience data record of the same program and the same date is already present in the audience data table 800 (S612). When separate parts of the same program are viewed, two records would be created. In the present embodiment, however, such records are coupled into one record so that only one record is present for one program.

If no audience data record of the same program and the same date is present, then the view percentage Q(P) is calculated, which, together with its channel ID, program ID, T1, T2, ST and ET, is added as one record into the audience data record table 800 (S613). If an audience data record of the same program and the same date is present, then the previous record is updated by adding a new set of ST and ET to the previous record, summing the current ΔT with the previous ΔT to create a new ΔT, and calculating a new Q(P) (S614).

Subsequently, as in step S603, a new program of the current channel CCH is identified (S615). Then, the current time is set as the view start time ST of the program (S617). After this, the CCH is set to the PCH and the process of this time is terminated (S617).

In previous step S606, if the current channel CCH is not the same as the previous channel PCH, that is, a channel change has occurred, then it is checked whether or not the program of the previous channel has been viewed continuously for x seconds or more (S609). This is, when a channel change has occurred, to create a new record if the previous channel has been viewed continuously for x seconds or more, and otherwise to ignore the view period of time. More specifically, if not viewed for x seconds or more, then control proceeds to step S615 where a new program is identified. If viewed for x seconds or more, then control proceeds to step S610 and the audience data of the previous channel is reflected in the audience data table 800 (S612–S614).

Figure 7:
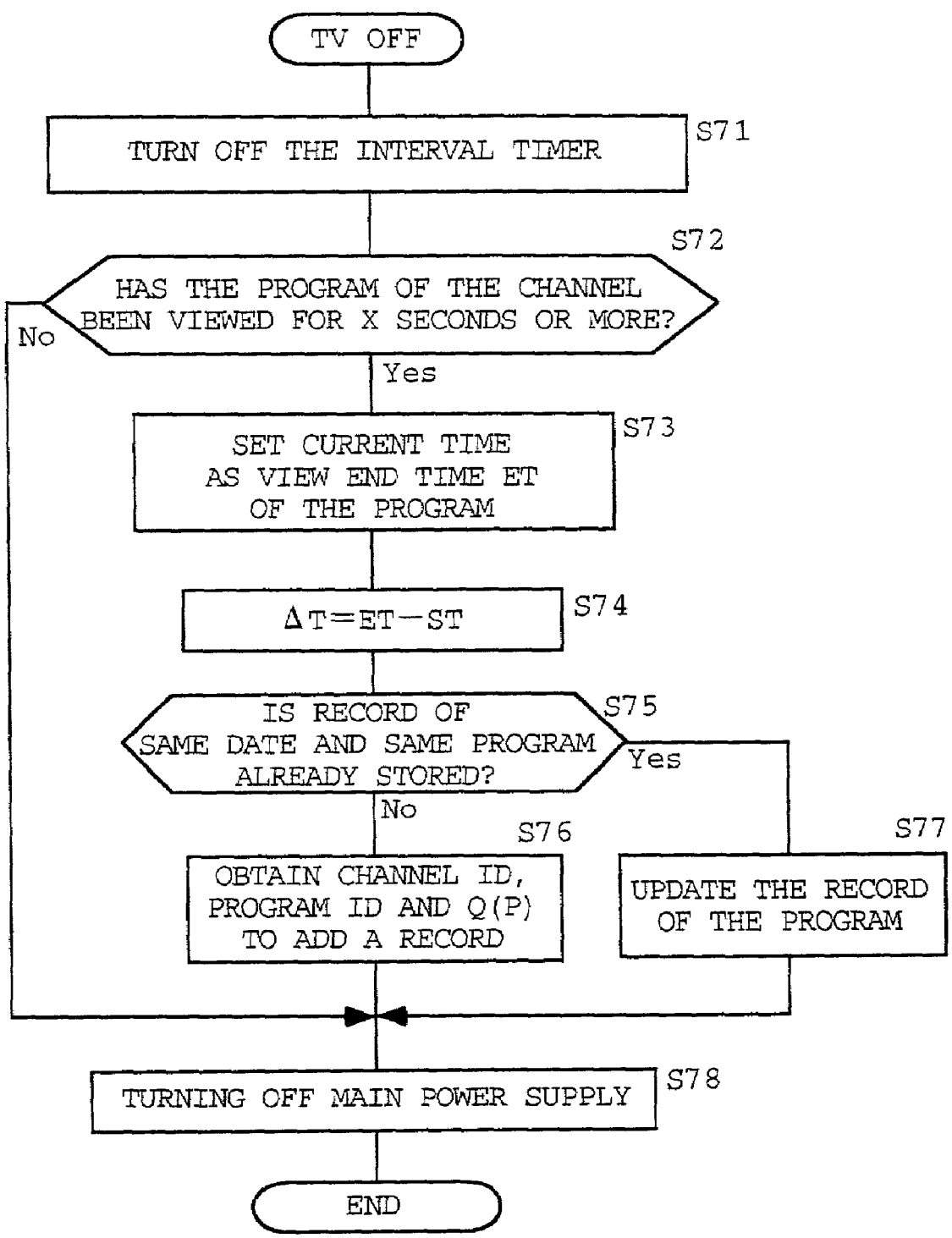
FIG. 7 is a flowchart showing an exemplary process which is performed when TV is turned off in the embodiment according to the present invention.

FIG. 7 shows an exemplary process which is performed when a viewer turns off the TV.

In the process of FIG. 7, firstly the interval timer previously mentioned is turned off (S71). This is a step to terminate the periodical execution of the FIG. 6 process since there is no need to acquire audience data after turning off the TV.

Subsequently, it is checked whether or not the program of the channel has been viewed for x seconds or more (S72). If not, the main power is shut down and the process is terminated (S78). Here, the "main power" is referred to as a power supply for the TV related parts of the device, and the CPU 101 is adapted to operate all the time.

If it is determined in step S72 that the program of the channel has been viewed for x seconds or more, then the current time is set as the view end time ET of the program (S73), and its ΔT is obtained (S74). Then, the process steps for adding a new record to or updating the audience data table 800 are performed (S75, S76 and S77). These process steps are the same as steps S612, S613 and S614 in FIG. 6. Finally, the main power is shut off and the process is terminated (S78).

Figure 9:
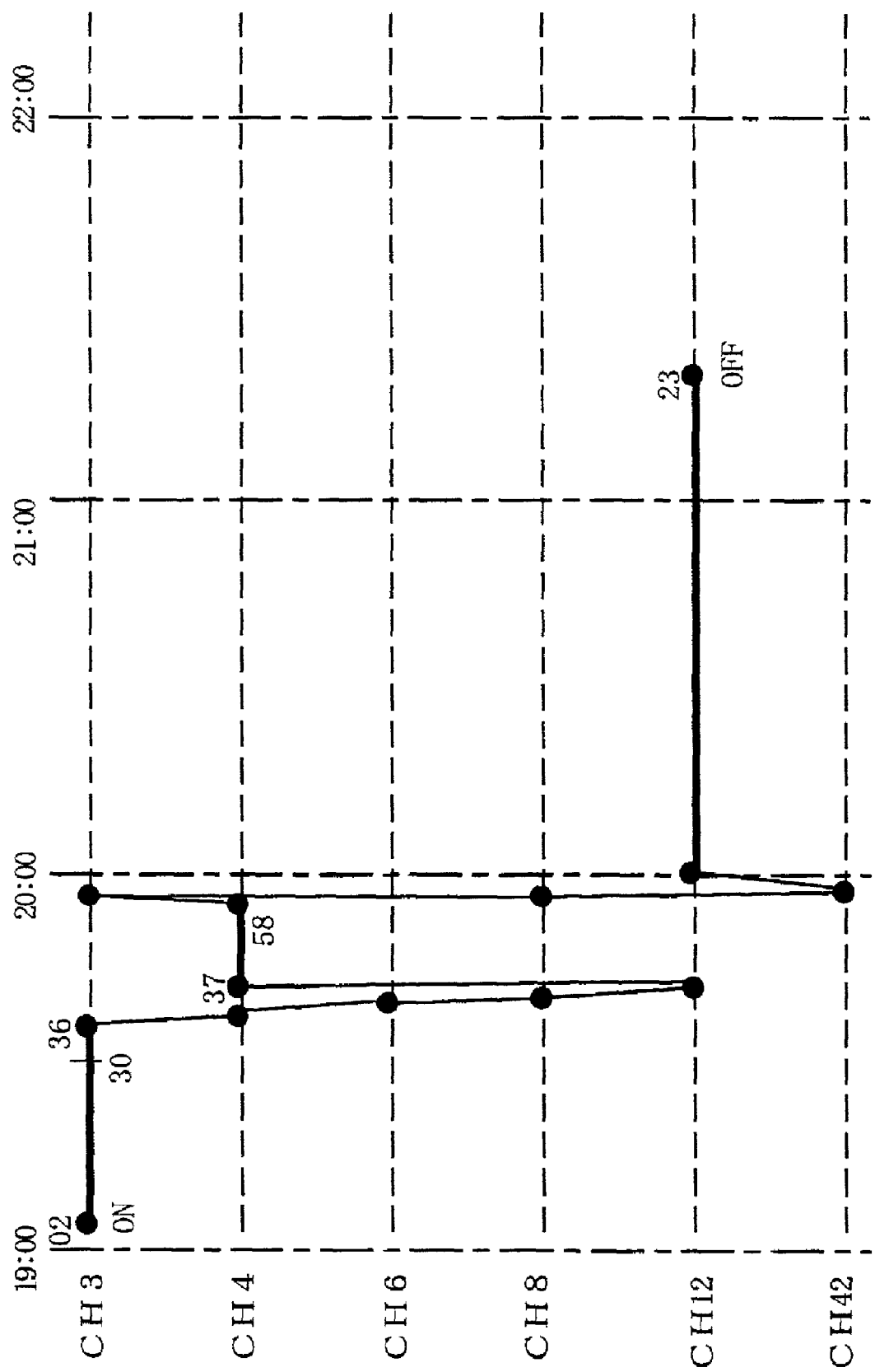
FIG. 9 is a graph showing a specific example of a TV viewing operation of a particular viewer in the embodiment according to the present invention.

FIG. 9 is a graph showing a specific example of a TV viewing operation of a particular viewer. This graph corresponds to the example shown by the audience data table of FIG. 8.

A viewer turns on the TV at 19:02. This starts the TV-on process (FIG. 5), after which the audience data acquisition process (FIG. 6) is periodically performed. In the first time of the audience acquisition process, it is recognized that the current viewed channel CCH at the current time is CH 3 whose program is "English Conversation" (S600, S603). At the same time, the times "19:00" and "19:30" are recognized as the start time T1 and end time T2 of the program, respectively. Also, the time "19:00" is stored as the view start time ST of the program. After that, since the current program of CH 3 ends at 19:30 (Yes in S608), and the view end time ET of the program "English Conversation" is settled as "19:30" (S610). In addition, the view period of time ΔT of the program is calculated as "00:28" (S611). Further, the view percentage Q(P) is calculated as "93%" (S613). These items of data are added as a record 810 to the table 800.

At 19:36, the viewer changes the channel from CH 3 to CH 4, CH 6, CH 8, CH 12, and CH 4 within a short period of time. At this time, the program "German Language" of the previous channel, CH 3, has been viewed for more than x seconds (i.e., 6 minutes) (Yes in S609), and hence, a new record 811 for that program is created to be added to the table 800 (S613). At each of the several switching times from 19:36, every viewed time for the channels does not reach x seconds (No in S609), and hence, the program and its view start time ST are updated each time the channel is switched (S615 and S616).

The channel is switched to CH 4 at 19:37, and then the channel is kept for a while. The channel is again switched at 19:58. At this point of time, since the program of the previous channel CH 4 has been viewed for more than x seconds (i.e., 21 minutes) (Yes in S609), a new record 812 of the program, "Animation 1", is created and added to the table 800 (S613).

Another channel switching starts at 19:58 to CH 3, CH 8 and CH 12 and settles at CH 12. Since these viewed times of the programs of the channels up to CH 12 do not reach x seconds, no records are created for the programs. The viewing of CH 12 continues till 21:23. However, the program, "Drama 3" reaches its end at 21:00. At this point of time, a new record 813 is created for this program and added to the table 800. With respect to the next program "Movie", a record 814 is created and added to the table 800 due to the TV turning off (S76).

FIG. 9 shows no event regarding the case where viewing of a particular program is interrupted and again returned afterwards. In such a case, however, addition of the times ST and ET, summation of ΔT, and updating of Q(P) will take place (S614) without creating additional record, as mentioned above. Instead, such additional record may be created for the same program so that the summation of ΔT and the updating of Q(P) are carried out at the collection center.

Figure 10:
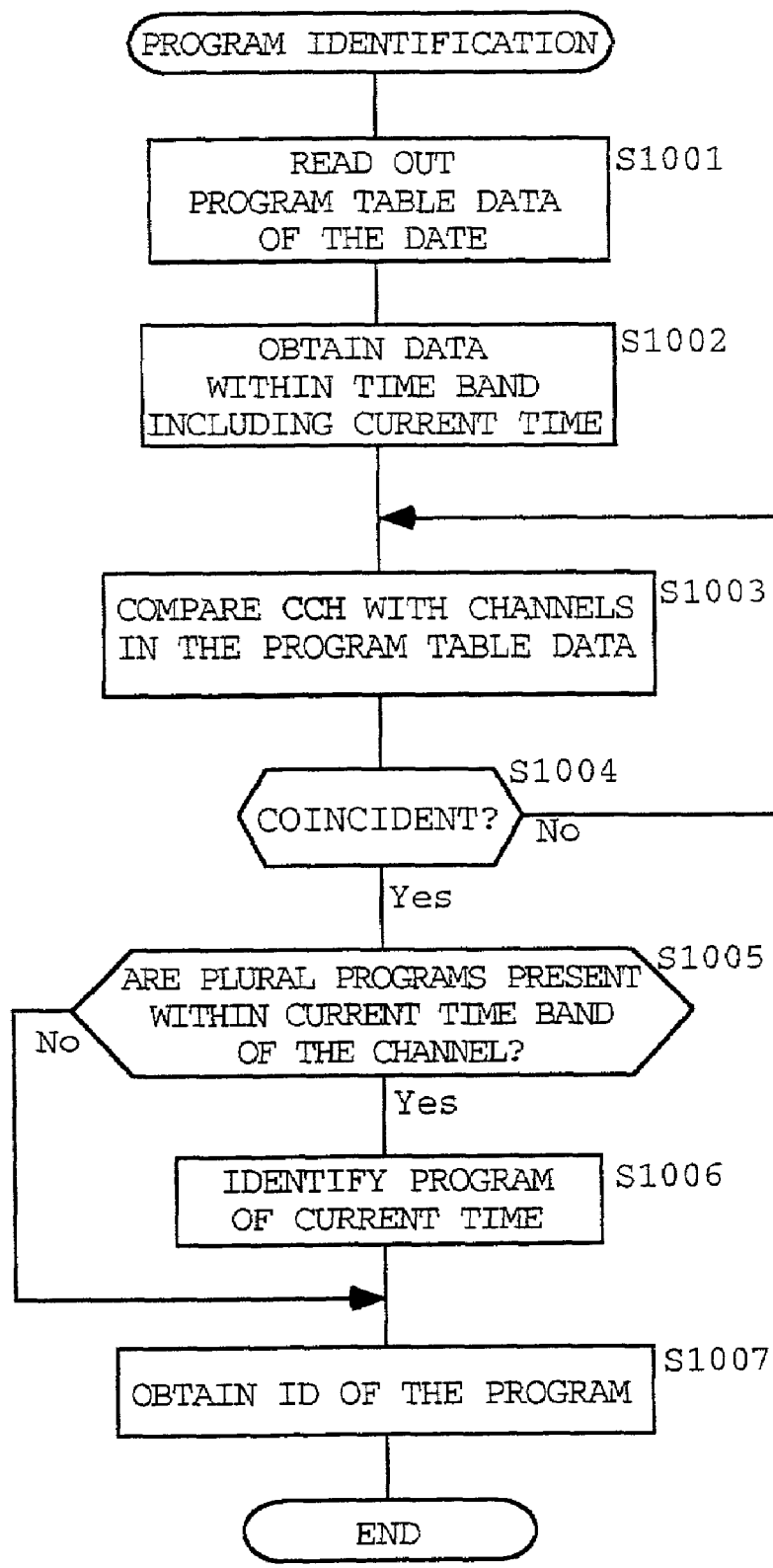
FIG. 10 is a flowchart showing an exemplary process for identifying a TV program in the embodiment according to the present invention.

FIG. 10 shows a detailed sequence of a process for identifying a program (title or program ID) at the current time of a particular channel, as in steps S603 and S615 of FIG. 6 process. Assume that, in this embodiment, the program table data is of a format which allows a sequential access to the programs of every channel for each time band of one hour, although the present invention is not limited to such data format.

In the process shown in FIG. 10, firstly program table data of the date is read out (S1001), and data of a time band including the current time is extracted (S1002). The channels in the program table data are checked until the current channel CCH coincides with the channel in the program table data (S1003 and S1004). Then, it is checked whether or not there are a plurality of programs in that time band of the channel CCH (S1005). (For example, three programs are found in the time band of 6:00 with respect to CH 3.) If not, control proceeds to step S1007. If any, a program corresponding to the current time is identified (S1006). In step S1007, a program ID for that program is obtained, and the FIG. 10 process is terminated.

Figure 11:
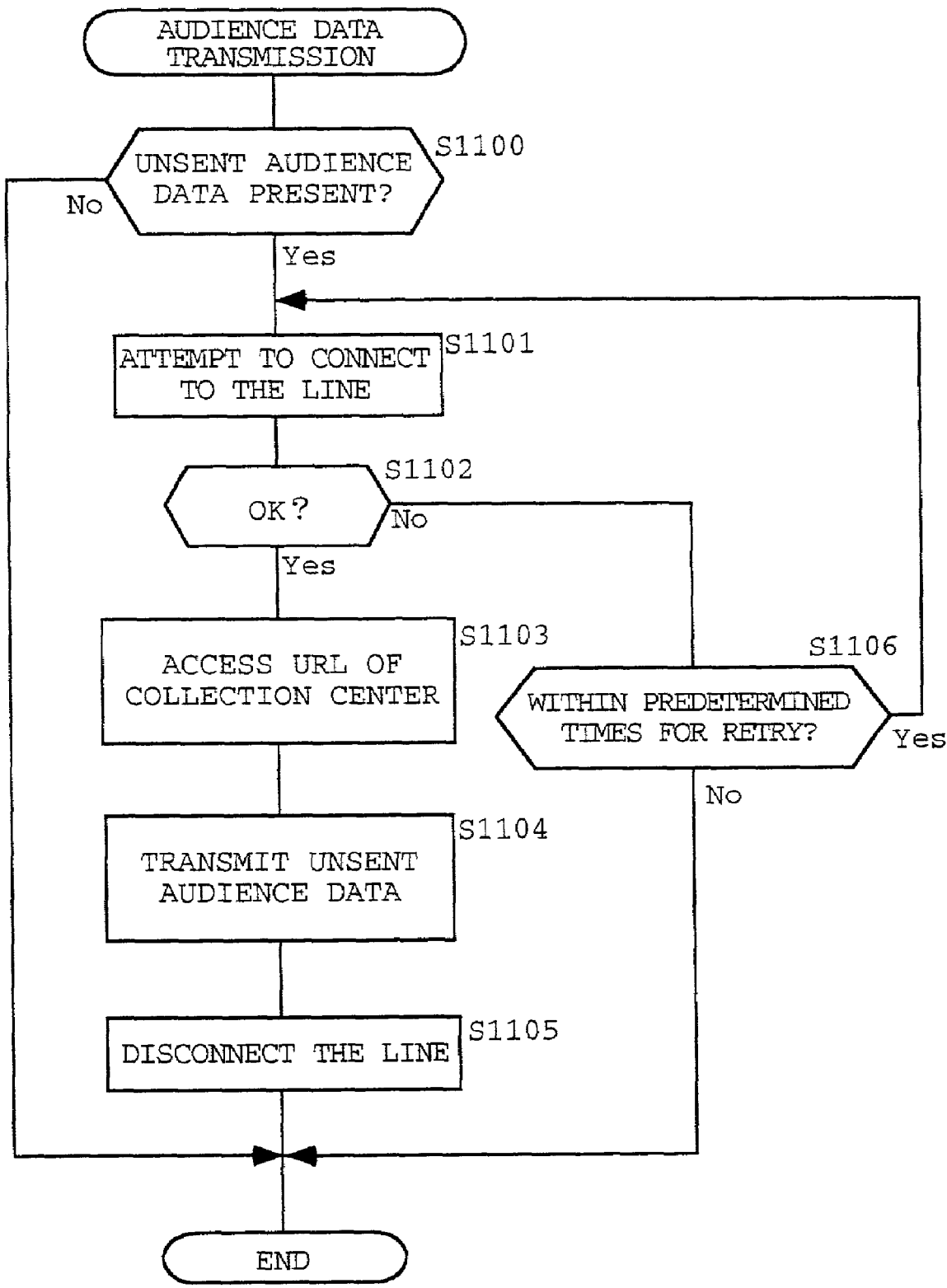
FIG. 11 is a flowchart showing an exemplary process for transmitting audience data in the embodiment according to the present invention.

FIG. 11 shows an exemplary process for transmitting, to the collection center, audience data stored in the audience data table 800 of FIG. 8. This process is activated regularly, e.g., once a day at predetermined time in midnight, to automatically access a site (URL) on the Internet that is a center for collecting audience data of TV programs.

In the process shown in FIG. 11, when it is recognized from the calendar/clock function that the set time (or date and time) has come, it is checked first whether or not there remains unsent audience data (S1100). This is because there is no need to transmit data when no audience data is stored. This decision step S1100 is also useful in a case where audience data are transmitted irregularly, e.g., at user's voluntary access to the Internet.

If there are unsent audience data, an attempt is made to connect to the line (S1101). If the line connection fails (No in S1102), then a retry will be made within predetermined times for retry (S1106 and S1101). If the number of times for retry is exceeded, then the connection to the line is abandoned and this process is terminated (END).

If the line connection is successful (Yes in S1102), then an access is first made to a URL of the collection center (S1103). This URL has been set in advance. For example, the URL is automatically stored in the flash memory 107 at the time of installing the program for obtaining audience data. Subsequently, the unsent audience data are transmitted to the site of the URL (S1104). Then, the line is disconnected (S1105) and this process is terminated. In view of the capacity of the storage device for storing the audience data, the sent data are preferably deleted automatically from the device at a predetermined timing (e.g., a predetermined days after the transmission).

In the present embodiment, the audience data transmission in step S1104 is performed through a dial-up connection to the Internet. In this event, an access is made to the server at the collection center so as to transmit data as an HTML text by the hyper Text Transfer Protocol (HTTP), or as an electronic mail by the Simple Mail Transfer Protocol (SMTP). In the former case, the server at the collection center can directly be accessed, thereby enabling immediate processing of the audience data. In the latter case, although a time lag until the audience data can be processed will occur to a some extent because of the need of accessing the mail server, the load on the server at the collection center will be dispersed.

In this way, the transmitted audience data are stored in a host computer at the collection center, in which desired audience ratings can be calculated based on the audience data. For example, an audience rating of a program can be calculated by a formula: (the number of household that viewed the program/the total number of the monitor households). Also, audience ratings at every minute from the start to the end of the program, or the average value may be calculated. Further, a so-called occupation rating may be calculated, which is a ratio of an audience rating of a particular broadcast station relative to the sum of audience ratings of a plurality of broadcast stations at a given time or time band.

Figure 12:
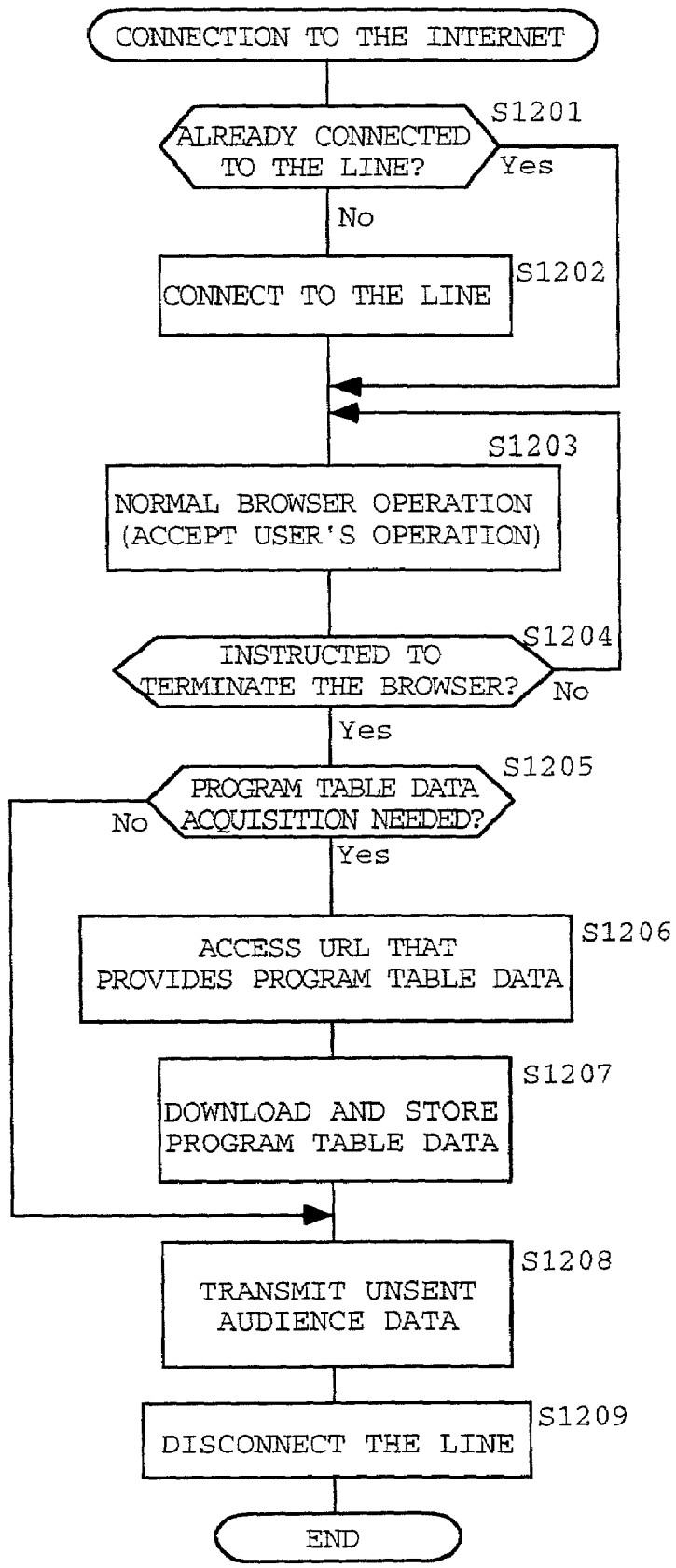
FIG. 12 is a flowchart showing an exemplary process which is performed when connecting to the Internet in the embodiment according to the present invention.

FIG. 12 shows a sequence of a process which is performed when a viewer voluntarily accesses the Internet. This is to make use of such opportunities to automatically obtain necessary program table data, or to automatically transmit unsent audience data to the collection center. This process has the following meanings: Since this process depends upon a viewer's voluntary action, such accessing is not his or her obligation and not to be expected. However, it is expected that some accesses to the Internet are made in a significant number of households. Therefore, such opportunities can be used to automatically acquire the program table data or to transmit the audience data, thereby relieving the congestion of accessing to the collection center in the case of regular accessing, and the concentration of the processing load on the collection center.

The process of FIG. 12 may be incorporated in a WWW browsing software, for example, a software called "browser". When this process is activated by a viewer, firstly it is checked whether or not the connection to the line has already been established (S1201). If not, the connection is made (S1202). Subsequently, a viewer's operation for normal browser operation is accepted to perform a predetermined operation (S1203).

Upon request for terminating the browser from the viewer (Yes in S1204), then a unique operation in the present embodiment will be performed. First, it is checked whether or not program table data is to be acquired (S1205). It is decided that no such acquisition is needed, for example, just after acquiring the program table data regularly as described with reference to FIG. 2, or when this process is activated twice or more in the same day. In the regularly activated process as in FIG. 2, the acquisition is made every week or every other week, and hence, in this process it is preferable to judge that no program table data acquisition is needed in step S1205 if new program data is obtained within one week from that day. (Whether such new data is obtained or not may depend upon whether the updating of the program table offered is made every day, every few days or every week.)

When no program table data acquisition is to be made, control proceeds to step S1208.

When program table data is to be acquired, the URL offering the program data table is accessed (S1206), and necessary program table data is acquired to be stored in a predetermined storage means (S1207).

Subsequently, if unsent audience data remains stored, then the data is transmitted to the collection center (S1208). The method of transmission is as stated above.

Finally, the line is disconnected (S1209) and this process is terminated.

Although a preferred embodiment of the present invention has been described hereinbefore, a lot of variations and modifications can be made without departing from the scope of the present invention.

For example, conventionally another audience rating research is performed which is made as to not only households, but individuals who are members of the household. For this purpose, an approach has been proposed that identifies the members by having them push their own selection buttons when selecting a channel with a remote controller, or by use of a sensor which identifies the members. The present invention is not intended to exclude such collection of individual audience data, but may be combined with any means for collecting individual information. In this case, the collection data table 800 as in FIG. 8 may be added with a column of ID which identifies individuals so that a record is created for each individual or each combination of individuals.

INDUSTRIAL APPLICABILITY

The present invention can be used in manufacturing an audience obtaining device which eases collection of processing of nationwide audience data by the use of the Internet. In addition, this device can be used to correlate each TV program with viewed channel and viewed time information on the viewer's side, thereby relieving the processing load at the collection center.

The invention claimed is:

1. A method for obtaining audience data on TV programs, in an audience data obtaining device which uses a computer, the method comprising the steps of:
   obtaining, from outside, TV program table data for an area where a viewer resides, said TV program table data including channel information and time information for each of TV programs planned to be broadcast in that area;
   detecting a channel that is being viewed by the viewer;
   detecting times at which a viewing of the channel is started and ended;
   identifying a program ID of a currently viewed program from said TV program table data by comparing said detected channel and a current time with the channel and time information of said TV program table data;
   obtaining audience data which include at least the program ID and viewed time information of the viewed program based on said TV program table data and results of the detecting of times, said viewed time information including at least one of (1) a view start time of each viewed program, (2) a view end time of each viewed program, and (3) a difference between the view start time and the view end time; and
   transferring, via the Internet to a collection center, the obtained audience data along with ID data of the viewer.

2. A method for obtaining audience data on TV programs according to claim 1, wherein said step of obtaining TV program table data includes automatically and regularly obtaining said TV program table data by use of the Internet or a broadcasting medium, and said step of transferring includes automatically and regularly performing the transmission to the collection center.

3. A method for obtaining audience data on TV programs according to claim 1, wherein said step of obtaining TV program table data includes automatically obtaining said TV program table data, and said step of transferring includes automatically performing the transmission to the collection center, both by making use of opportunities of the viewer's accessing the Internet.

4. A method for obtaining audience data on TV programs according to claim 1, wherein said step of obtaining audience data includes ignoring a continuously viewed time of a program when the viewed time is shorter than a predetermined time.

5. A method for obtaining audience data on TV programs according to claim 1, wherein said step of transferring includes transmitting said data to be transferred as an HTML text document or an electronic mail.

6. A device for obtaining audience data on TV programs, comprising:
- a program table data obtaining means far obtaining, from outside, TV program table data for an area where a viewer resides, said TV program table data including channel information and time information for each of TV programs planned to be broadcast in that area;
- a first detector for detecting a channel that is being viewed by the viewer;
- a second detector for detecting times at which a viewing of the channel is started and ended;
- a program identification means for identifying a program ID of a currently viewed program from said TV program table data by comparing said detected channel and a current time with the channel and time information of said TV program table data;
- an audience data obtaining means for obtaining audience data which include at least the program ID and viewed time information of the viewed program based on results of the detecting of times and said TV program table data, said viewed time information including at least one of (1) a view start time of each viewed program, (2) a view end time of each viewed program, and (3) a difference between the view start time and the view end time; and
- a transfer means for transferring, via the Internet to a collection center, the obtained program ID and the viewed time information along with ID data of the viewer.

7. A device for obtaining audience data on TV programs according to claim 6, wherein said program table data obtaining means automatically and regularly acquires said TV program table data by making use of the Internet or a broadcasting medium.

8. A device for obtaining audience data on TV programs according to claim 6, wherein said program table data obtaining means acquires said TV program table data by making use of opportunities of the viewer's accessing the Internet.

9. A device for obtaining audience data on TV programs according to claim 6, wherein said program identification means ignores a continuously viewed time of a program when the viewed time is aborter than a predetermined time.

10. A device for obtaining audience data on TV programs according to claim 6, wherein said transfer means transmits said data to be transferred, as an HTML text document or an electronic mail.

11. A recording medium storing a computer, readable program for carrying out the steps of:
- obtaining, from outside, TV program table data for an area where a viewer resides, said TV program table data including channel information and time information for each of TV programs planned to be broadcast in that area;
- detecting a channel that is being viewed by the viewer;
- detecting times at which a viewing of the channel is started and ended;
- identifying a program ID of a currently viewed program from said TV program table data by comparing said detected channel and a current tune with the channel and time information of said TV program table data;
- obtaining audience data which include at least the program ID and viewed time information of the viewed program based on said TV program table data and results of the detecting of times, said viewed time information including at least one of (1) a view start time of each viewed program, (2) a view end time of each viewed program, and (3) a difference between the view start time and the view end time; and
- transferring, via the Internet to a collection center, the obtained audience data along with ID data of the viewer.

12. A method for obtaining audience data on TV programs according to claim 2, wherein said first step includes automatically obtaining said TV program table data, and said forth step includes automatically performing the transmission to the collection center, both by making use of opportunities of the viewer's accessing the Internet.

13. A device for obtaining audience data on TV programs according to claim 7, wherein said program table data obtaining means acquires said TV program table data by making use of opportunities of the viewer's accessing the Internet.

14. A method for obtaining audience data on TV programs according to claim 1, wherein said TV program table is a matrix data table which defines program ID's of programs specified by channels in one axis of the matrix and time zones in another axis.

15. A device according to claim 6, wherein said TV program table is a matrix data table which defines program ID's of programs specified by channels in one axis of the matrix and time zones in another axis.

16. A recording medium according to claim 11, wherein said TV program table is a matrix data table which defines program ID's of programs specified by channels in one axis of the matrix and time zones in another axis.

17. A method for obtaining audience data on TV programs, in an audience data obtaining device which uses a computer, the method comprising the steps of:
- obtaining, from outside, TV program table data for an area where a viewer resides, said TV program table data including channel information and time information for each of TV programs planned to be broadcast in that area;
- detecting a channel that is being viewed by the viewer;
- detecting times at which a viewing of the channel is started and ended;
- identifying a program ID of a currently viewed program from said TV program table data by comparing said detected channel and a current time with the channel and time information of said TV program table data;
- obtaining audience data which include at least the program ID and viewed time information of the viewed program based on said TV program table data and results of the detecting of times, said viewed time information including at least one of (1) a view start time of each viewed program, (2) a view end time of each viewed program, and (3) a difference between the view start time and the view end time; and transferring, via the Internet to a collection center, the obtained audience data along with ID data of the viewer by making use of opportunities of the viewer's accessing the Internet.

18. A method for obtaining audience data on TV programs according to claim 17, wherein said step of transferring is performed during an operation of a WWW browsing software.

19. A method far obtaining audience data on TV programs according to claim 18, wherein unsent audience data is transmitted upon request for terminating the operation of the WWW browsing software.

20. A method for obtaining audience data on TV programs according to claim 17, further comprising a step of connecting to the Internet before the step of transferring.

21. A method for obtaining audience data on TV programs according to claim 17, wherein said step of obtaining TV program table data is achieved by making use of opportunities of the viewer's accessing the Internet.

22. A device for obtaining audience data on TV programs, comprising:
- a program table data obtaining means for obtaining, from outside, TV program table data for an area where a viewer resides, said TV program table data including channel information and time information for each of TV programs planned to be broadcast in that area;
- a first detector for detecting a channel that is being viewed by the viewer;
- a second detector for detecting times at which a viewing of the channel is started and ended;
- a program identification means for identifying a program ID of a currently viewed program from said TV program table data by comparing said detected channel and a current time with the channel and time information of said TV program table data;
- an audience data obtaining means for obtaining audience data which include at least the program ID and viewed time information of the viewed program based on results of the detecting of times and said TV program table data, said viewed time information including at least one of (1) a view start time of each viewed program, (2) a view end time of each viewed program, and (3) a difference between the view start time and the view end time; and
- a transfer means for transferring, via the Internet to a collection center, the obtained program ID and the viewed time information along with ID data of the viewer by making use of opportunities of the viewer's accessing the Internet.

23. A device for obtaining audience data of TV programs according to claim 22, wherein said step of transferring is performed during an operation of a WWW browsing software.

24. A recording medium storing a computer readable program for carrying out the steps of:
- obtaining, from outside, TV program table data for an area where a viewer resides, said TV program table data including channel information and time information for each of TV programs planned to be broadcast in that area;
- detecting a channel that is being viewed by the viewer;
- detecting times at which a viewing of the channel is started and ended;
- identifying a program ID of a currently viewed program from said TV program table data by comparing said detected channel and a current time with the channel and time information of said TV program table data;
- obtaining audience data which include at least the program ID and viewed time information of the viewed program based on said TV program table data and results of the detecting of times, said viewed time information including at least one of (1) a view start time of each viewed program, (2) a view end time of each viewed program, and (3) a difference between the view start time and the view end time; and
- transferring, via the Internet to a collection center, the obtained audience data along with ID data of the viewer by making use of opportunities of the viewer's accessing the Internet.

25. A recording medium according to claim 24, wherein said step of transferring is performed during an operation of a WWW browsing software.

* * * * *